United States Patent [19]

Smith

[11] Patent Number: 5,386,375
[45] Date of Patent: Jan. 31, 1995

[54] FLOATING POINT DATA PROCESSOR AND A METHOD FOR PERFORMING A FLOATING POINT SQUARE ROOT OPERATION WITHIN THE DATA PROCESSOR

[75] Inventor: Roger A. Smith, Austin, Tex.
[73] Assignee: Motorola, Inc., Schaumburg, Ill.
[21] Appl. No.: 143,965
[22] Filed: Nov. 1, 1993
[51] Int. Cl.⁶ ............................................. G06F 7/38
[52] U.S. Cl. ..................................... 364/748; 364/752
[58] Field of Search ................................. 364/748, 752

[56] References Cited

U.S. PATENT DOCUMENTS

| | | | |
|---|---|---|---|
| 4,939,686 | 7/1990 | Fandrianto | 364/752 |
| 5,128,891 | 7/1992 | Lynch et al. | 364/752 |
| 5,245,564 | 9/1993 | Quek et al. | 364/735 |
| 5,293,558 | 3/1994 | Narita et al. | 364/752 |

Primary Examiner—Tan V. Mai
Attorney, Agent, or Firm—Keith E. Witek

[57] ABSTRACT

A method and apparatus used for performing a floating pointing operation has the ability to calculate a square root of a number. An approximation to the inverse of the square root of the number is provided via a step (18). Steps (20 and 22) are used to improve the precision of the inverse of the square root until a predetermined precision is attained. The inverse of the square root, which has a predetermined precision, is used along with the number to generate both an exact floating point value and a small floating point value via steps (24 and 26). The exact and small floating point values are added together in a sum and manipulated to fit into the floating point representation available to the apparatus. The sum is a substantially close approximation to the square root of the number and is either output directly or slightly modified numerically to more accurately represent the square root of the number.

51 Claims, 6 Drawing Sheets

5,386,375

FLOATING POINT DATA PROCESSOR AND A METHOD FOR PERFORMING A FLOATING POINT SQUARE ROOT OPERATION WITHIN THE DATA PROCESSOR

FIELD OF THE INVENTION

The present invention relates generally to data processors with floating point capability, and more particularly, to square root calculations in a data processor.

BACKGROUND OF THE INVENTION

In the past, a common method of producing the square root has been to use a restoring algorithm which in each iteration step produces one new bit. This is disadvantageous for floating point representations with a large number of significant bits because the number of cycles is slightly greater than the number of bits. Even with more complex circuitry, the restoring methods take a number of cycles proportional to the number of significant bits plus a small overhead.

Also, known quadratic iterations and known cubic iterations have been used as the basis for approximate square root calculations. As discussed herein, there is sufficient inherent inaccuracy and roundoff error that these cannot give a satisfactory starting value without some means of achieving extra precision. In the past, this has meant that either additional complex circuitry was needed, or laborious calculations after a set of iterations was needed to find the rounded square root result for a given rounding mode. The circuitry needed for implementing the restoring algorithm is dissimilar to that needed for the quadratic or cubic iterations, and the transition from one method to the other is slow.

In the past, Newton-Raphson iterations based on improving the square root rather than the inverse square root have been used. These types of methods have two problems: they involve a division operation which is significantly slower on many data processors than multiplication or addition/subtraction operations. In addition, there is not enough accuracy preserved in carrying out the calculation to get the right result without having to perform a number of result-alteration tests. There exists an algorithm which does these calculations sufficiently accurately but it requires significant additional hardware capable of multiplying two numbers to form a product and adding the product to a third number to form an exact sum which is then rounded. This significant additional hardware increases a cost of the product, which is definitely disadvantageous.

SUMMARY OF THE INVENTION

The previously mentioned disadvantages are overcome and other advantages achieved with the present invention. In one form, the present invention comprises a method for providing a square root, in a data processor, of a number having an exact square root. The method begins by transmitting, via a hardware bus, at least one control signal and a data value from a control unit of the data processor to a floating point processor portion of the data processor. The control signal is asserted if the floating point processor portion is to find the square root of the number. An approximate inverse square root number is generated within the floating point processor portion wherein the approximate inverse square root number does not exactly equal an inverse of the exact square root of the number, The data processor is capable of representing the square root in P hardware bits of precision within the floating point processor portion where P is a finite integer greater than zero. The approximate inverse square root number is processed to generate an exact component value within the floating point processor portion. The exact component value has Q hardware significant bits and may be represented in P bits with no loss of significant bits because $Q \leq P$. The approximate inverse square root number is used to generate a small component value from the approximate square root number wherein the small component value is significantly less than the exact component value. The exact component value and the small component value are added within the floating point processor portion to provide a trial value wherein the trial value is altered to be representible in P bits. Either the trial value or the trial value plus a constant is selected as the square root of the number.

In another form, the invention comprises a data processor for calculating a square root of a number. The data processor has an execution device for processing data within the data processor, circuitry for approximating an inverse square root of the number coupled to the execution device, a memory device, and circuitry for processing the square root operation. The memory device stores a first binary value and a second binary value wherein the first binary value, when decoded by the execution device, indicates that a square root operation is to be performed on the second binary value. The circuitry for processing receives a square root approximation from the circuitry for providing an inverse square root approximation. The circuitry for processing provides a more accurate inverse square root approximation from the inverse square root approximation. The circuitry for processing uses the more accurate inverse square root approximation and the number to generate an exact floating point value and a small floating point value wherein the sum of the exact floating point value and the small floating point value is a substantially close approximation to the actual square root of the number. The circuitry for processing selectively adds a constant value to a least significant bit position of the substantially close approximation in order to more accurately represent the actual square root of the number.

The present invention will be more clearly understood from the detailed description below in conjunction with the accompanying drawings.

Figure 1:
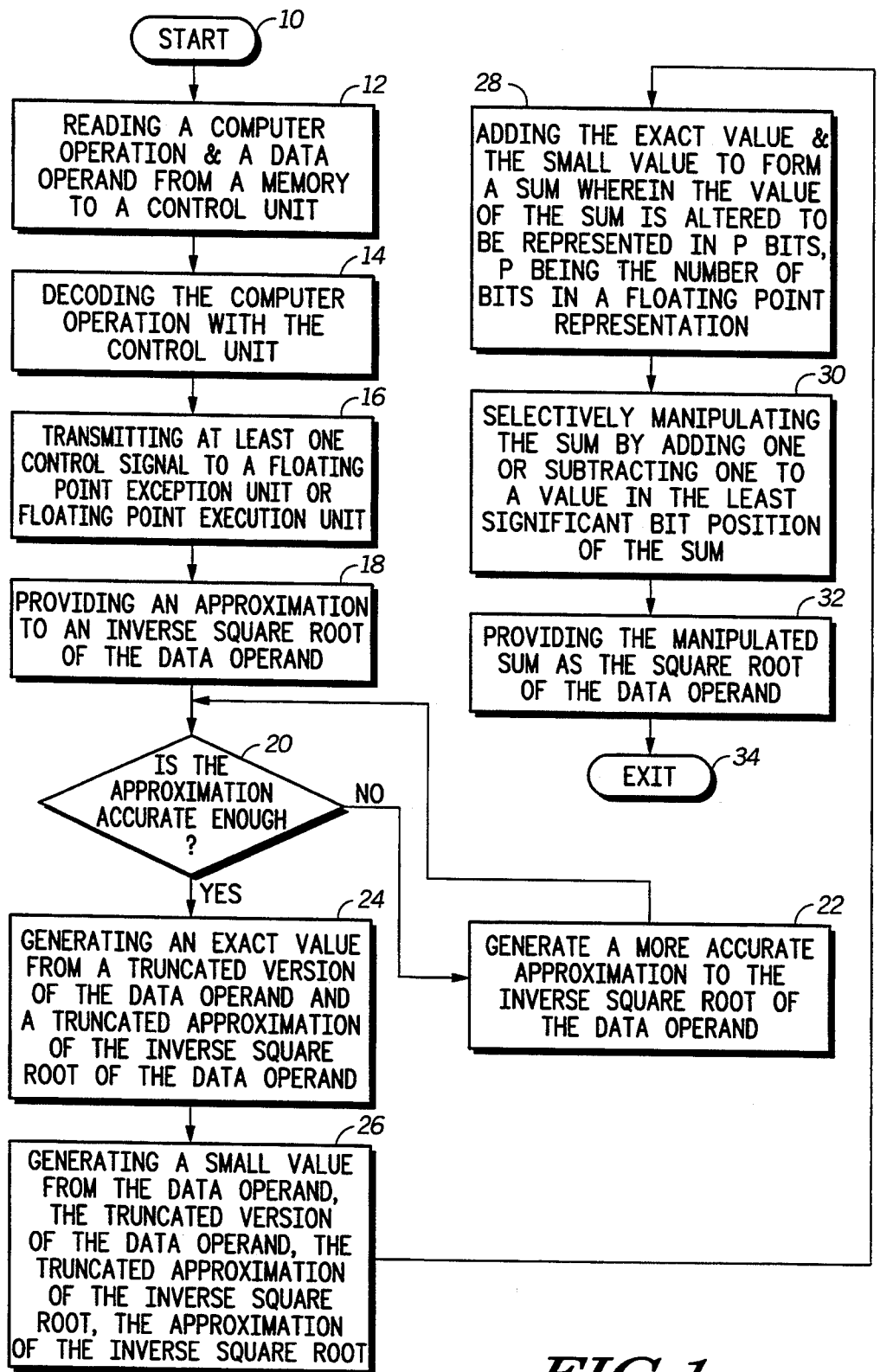
FIG. 1 illustrates, in a flowchart, a method for performing a floating point operation in a data processor in accordance with the present invention.

It will be appreciated that for simplicity and clarity of illustration, elements illustrated in the FIGURES have not necessarily been drawn to scale. For example, the dimensions of some of the elements are exaggerated relative to other elements for clarity. Further, where considered appropriate, reference numerals have been repeated among the FIGURES to indicate corresponding or analogous elements.

DESCRIPTION OF A PREFERRED EMBODIMENT

Generally, the present invention provides a method and apparatus for performing a floating point operation within a data processor. In particular, a square root calculation of a data operand representing a positive real number is performed by the data processor to yield a square root result. This is accomplished by providing an approximate inverse square root of the data operand and performing a set of iterations which rapidly improve the precision of the approximate inverse square root. Each iteration may roughly double or triple the number of significant bits. Previous methods become inefficient at this point, since it has appeared that to get the desired precision for the final square root would require additional circuitry or an awkward change of method to obtain a final result. The novel approach of the present invention allows the desired precision to be obtained without the use of higher precision arithmetic by performing separate calculation steps for an exact part and a small part of a trial result, such that a rounded sum of these two parts gives the trial result which is accurate enough that the square root result is either the trial result or a single other number which is easily computed from the trial result. A selective manipulation of the trial result yields the square root result.

The method assumes that the data processor uses a floating point representation, wherein a set of real numbers and non-numeric items is represented or encoded by the data processor. A data operand or a result of a floating point operation can be an element of the set. If the set contains a finite number of elements, a finite number of real numbers can be represented by the floating point representation. Each element of the set representing a real number does represent a real number, but not all real numbers are represented by an element of the set. An arithmetic operation on one or more real numbers represented by elements of the set may result in a real number which is not an element of the set. In that case, the result may be altered to a rounded result which is a real number or a non-numeric item represented by an element in the set.

While the present invention is not constrained by a particular choice of the floating point representation, the presentation of the invention is simplified by discussing an implementation applicable to a model floating point representation which is representative of commonly used floating point representations. In the model floating point representation, an element of the set is implemented as a sequence of bits. A floating point number is a real number represented by a sequence of bits comprising a sign field of 1 bit, an exponent field of E bits and a fraction field of P bits. For a normalized floating point number, the fraction field has a most significant bit which is 1, and the most significant bit may be represented explicitly or implicitly since its value is known. One or more bit sequences also represent the real number 0. The number P represents a precision, measured in bits, within which numbers can be distinguished. A set of floating point arithmetic operations including floating point addition, floating point subtraction, floating point multiplication and floating point square root are defined for the model. The model floating point representation includes a round-to-nearest rounding mode, a round-down rounding mode, and a round-up rounding mode. If an arithmetic operation on one or more operands yields a real result which is not a floating point number, the rounded result is obtained in a different way for each rounding mode. In the round-to-nearest rounding mode, the floating point result is a floating point number which is algebraically as close or closer to the real result. In the round-down rounding mode, the floating point result is a floating point number which is the largest floating point number not algebraically larger than the real result. In the round-up rounding mode, the floating point result is a floating point number which is the smallest floating point number not algebraically less than the real result. The model floating point representation also has a means of indicating whether the floating point result represents the real result.

In the implementation of the floating point square root operation for the data processor using the model floating point representation, the data processor is assumed to be directly capable of executing floating point addition, floating point subtraction, and floating point multiplication operations in any of the three rounding modes. The implementation of the invention for the data processor is to be able to produce the floating point square root rounded in a given rounding mode.

The present invention can be more fully understood with reference to FIGS. 1-6. FIG. 1 illustrates a flowchart which illustrates a manner for performing a floating point square root operation in accordance with the present invention. In the description that follows, a number of symbols are defined. Each symbol represents a particular real number.

The method begins in step 10. In step 12, a computer instruction, used to take the floating point square root of a dam operand, is read from a memory into a control unit. The computer instruction specifies a location in a memory or a location in a register wherein the data operand is stored. In step 14, the control unit decodes the computer instruction and determines that the floating point square root of the data operand is to be taken. In a step 16, the control unit transmits at least one control signal to a floating point unit or floating point exception unit to initiate a sequence of operations to compute the floating point square root of the data operand.

If the data operand does not represent a real number, the square root result depends on unspecified features of the model floating point representation. The action to be taken may vary from implementation to implementation; for example, an exception may be raised or the square root result may not represent a real number.

Let s denote the value of the data operand, now assumed to be numeric. If s is negative, there does not exist a real number whose square is s. The action to be taken may vary from implementation to implementation.

If s, now assumed to be numeric and non-negative, is 0, the square root result is a particular square root result which is representation of 0. The particular result may depend on the actual data operand and not just its numeric value of 0.

Let $\sqrt{s}$ denote a positive square root of s, now assumed to be positive. Let z denote a rounded square root which is a real number obtained by rounding $\sqrt{s}$ in the given rounding mode; the number z: may differ from the number $\sqrt{s}$ due to rounding. The floating point square root of the data operand is a bit sequence representing the rounded square root z.

In step 18, an initial approximate inverse square root of the data operand is provided. Let $y_0$ be the initial approximate inverse square root of the data operand. Such a number is obtainable for all data operands representing numbers other than zero. The approximation $y_0$ may be obtained by various means. As examples, it might be obtained by looking up in a table based on the exponent field and some of the bits of the fraction field of the data operand or it might be obtained by performing some computation involving the exponent field and the fraction field. Special-purpose circuitry or a state machine might also be used to generate this value.

The accuracy with which $y_0$ represents $$\frac{1}{\sqrt{s}}$$

affects the speed with which the value x will be computed. A measure of the accuracy of $y_0$ is given by a relative error $$\eta_0 = \frac{\left(y_0 - \frac{1}{\sqrt{s}}\right)}{\frac{1}{\sqrt{s}}} \quad \text{(EQ 1)}$$

In steps 20 and 22, the initial approximate inverse square root $y_0$ is transformed into a final approximate inverse square root $y_m$ by a sequence of m transformations, where m is an integer greater than or equal to zero. FIG. 1 shows this as an iterative process in which step 20 determines whether the present approximation is accurate enough to proceed to step 24 and step 22 determines a more accurate approximation if the proper accuracy has not been achieved. In an actual implementation the number of transformations may be predetermined and steps 20 and 22 replaced by a straight calculation of the predetermined transformations. In either case, a given transformation is represented by step 22 which takes a previous approximate inverse square root $y_i$ as input and produces a more accurate approximate inverse square root $y_{i+1}$. For any i, a relative error $\eta_i$ of $y_i$ is $$\eta_i = \frac{\left(y_i - \frac{1}{\sqrt{s}}\right)}{\frac{1}{\sqrt{s}}} \quad \text{(EQ 2)}$$

A quadratic iteration is one possible method for performing step 22. In the quadratic iteration, the more accurate approximate inverse square root is given by $$y_{i+1} = y_i \left(\frac{3}{2} - \frac{1}{2} sy_i^2\right) \quad \text{(EQ 3)}$$

and the relative error of the more accurate approximate inverse square root is related to the relative error of the previous approximate inverse square root by $$\eta_{i+1} = -\frac{3}{2}\eta_i^2 - \frac{1}{2}\eta_i^3 \quad \text{(EQ 4)}$$

This equation shows that the number of significant bits approximately doubles after one quadratic iteration.

A cubic iteration is another possible method for performing step 22. In the cubic iteration, the more accurate approximate inverse square root is given by $$y_{i+1} = y_i \left(\frac{15}{8} - \frac{5}{4} sy_i^2 + \frac{3}{8} (sy_i^2)^2\right) \quad \text{(EQ 5)}$$

and the relative error of the more accurate approximate inverse square root is related to the relative error of the previous approximate inverse square root by $$\eta_{i+1} = \frac{5}{2}\eta_i^3 + \frac{15}{8}\eta_i^4 + \frac{3}{8}\eta_i^5 \quad \text{(EQ 6)}$$

The above equation shows that the number of significant bits approximately triples after one cubic iteration.

Other iteration sequences to compute $y_{i+1}$ from $y_i$ are possible. For example, it is straightforward mathematically to derive approximations in which the number of significant bits is approximately multiplied by any positive integer greater than 3.

The absolute value of the relative error of the final approximate inverse square root $\eta_m$ needs to be slightly smaller than $2^{-P/2}$. A quarter as big is a safe limit, while somewhat larger limits may be possible in particular implementations. Roughly speaking, this means that after m iterations, the approximation $y_m$ must have somewhat more than $$\frac{P}{2}$$

accurate bits. In a particular implementation, the number m may depend on P, the worst-case relative error $\eta_0$ of the initial approximate inverse square root $y_0$, and the relative efficiencies for the particular implementation of quadratic, cubic or other iteration steps. EQS. 1-6 are useful in determining the most efficient iteration scheme for the particular implementation.

One approach to computing z is to use one final quadratic iteration like EQ. 3 but including an extra factor of s. Let x be given by the equation $$x = sy_m \left(\frac{3}{2} - \frac{1}{2} sy_m^2\right) \quad \text{(EQ 7)}$$

The relative error of x with respect to $\sqrt{s}$ is given by $$\eta = \frac{x - \sqrt{s}}{\sqrt{s}} = -\frac{3}{2}\eta_m^2 - \frac{1}{2}\eta_m^3 \quad \text{(EQ 8)}$$

This means that x will have approximately P bits of accuracy if the calculation carried out in EQ. 7 is carried out in complete accuracy. If the sequence of arithmetic operations used in EQ. 7 are carried out in the model floating point representation with p bits of accuracy, the accumulated rounding errors will in many cases cause the x computed from EQ. 7 to differ from the ideal value by several bits. In additional, the rounded square root result cannot be computed directly by rounding x since while x may be close to $\sqrt{s}$, it may round to a different number than would $\sqrt{s}$. The combination of intrinsic error in the result x computed in EQ. 7 and the additional error caused by arithmetic with P bits of accuracy would lead to a time-consuming search for the correct value after rounding. This searching is unacceptable when trying to achieve a fast square root calculation.

In fact, in order to narrow the search range to include just two numbers, the value of x must be computed with greater than P bits of accuracy. There are three cases to consider, depending on whether the rounding mode is round-to-nearest, round-down or round-up.

For the round-to-nearest rounding mode, let x' be the result of rounding down the value of x from EQ 7 in the model floating point representation. This guarantees that $$x' \leq x < x' + \epsilon \quad \text{(EQ 9)}$$

where $\epsilon$ is the value of the least significant bit position of the number x' in the floating point representation. Now if $$|x - \sqrt{s}| < \frac{\epsilon}{2} \quad \text{(EQ 10)}$$

then it follows that $$|x' - \sqrt{s}| \leq |x' - x| + |x - \sqrt{s}| < \frac{3}{2}\epsilon \quad \text{(EQ 11)}$$

and $$|x' + \epsilon - \sqrt{s}| \leq |x' + \epsilon - x| + |x - \sqrt{s}| < \frac{3}{2}\epsilon \quad \text{(EQ 12)}$$

Taken together, EQS 11 and 12 guarantee that for the round-to-nearest rounding mode, the rounded square root result z is either x' or x'+$\epsilon$. To determine which is the correctly rounded result, it suffices to compare s with x'(x'+$\epsilon$). If s is larger, then the correctly rounded result is x'+$\epsilon$; otherwise the correctly rounded result is x'.

For the round down rounding mode, let x'' be the result of rounding the computation of x in EQ 7 using the round-to-nearest rounding mode. This implies $$|x'' - x| \leq \frac{\epsilon}{2} \quad \text{(EQ 13)}$$

where $\epsilon$ is still the value of the least significant bit position of the number obtained by rounding x down. This is usually the same as the value $\epsilon'$ of the least significant bit position of x'', but may be half as big. If in addition, $$|x - \sqrt{s}| < \frac{\epsilon}{2} \quad \text{(EQ 14)}$$

then $$|x'' - \sqrt{s}| \leq \epsilon \quad \text{(EQ 15)}$$

which guarantees that for the round-down rounding mode, the rounded square root result is either x'' or x''−$\epsilon$. This may be decided by comparing s with x''$^2$. If s≥x''$^2$, the properly rounded result is x''; otherwise the properly rounded result is x''−$\epsilon$.

For the round-up rounding mode, let x''' be the result of rounding the computation of x in EQ 7 using the round-to-nearest rounding mode. This implies $$|x'' - x| \leq \frac{\epsilon}{2} \quad \text{(EQ 16)}$$

where $\epsilon$ is still the value of the least significant bit position of the number obtained by rounding x down. This is usually the same as the value of the least significant bit position of x''', but may be half as big. If in addition, $$|x - \sqrt{s}| < \frac{\epsilon}{2} \quad \text{(EQ 17)}$$

then $$|x''' - \sqrt{s}| \leq \epsilon \quad \text{(EQ 18)}$$

which guarantees that the correctly rounded up square root result is either x''' or x'''+$\epsilon$'. This may be decided by comparing s with x'''$^2$. If s≥x'''$^2$, the properly rounded result is x'''+$\epsilon$'; otherwise the properly rounded result is x'''. Therefore, due to the relationships expressed in EQS 10, 14, and 17, the unacceptable searching identified above is significantly reduced in scope.

Specifically, EQS 9–18 show that for any rounding mode, if the result of EQ 7 can be computed with an absolute error smaller than $$\frac{\epsilon}{2},$$

then there is a straightforward computation to determine an x' if the square root results to be rounded to nearest, an x'' if the square root result is to be rounded toward zero, and an x''' if the square root result is to be rounded up. While it is apparent from the quadratic and cubic iteration formulas that it is not hard to find a value $y_m$ for which the exact computation of EQ 7 would have the desired error bound, it is not immediately apparent how to compute the value x given by EQ 7 to greater accuracy than that available with arithmetic with proper rounding to P bits of precision. The complications are that the intermediate result x must apparently be computed through a sequence of floating point arithmetic operations which introduces an error larger in magnitude than that which is acceptable. Steps 24, 26, and 28 provide one solution to this problem.

In step 24, the data operands is broken up into a large part $\bar{s}$ and a small part $\delta s$ by $$s = \bar{s} + \delta s \qquad (EQ\ 19)$$

and the approximate inverse square root $y_m$ is broken up into a large part $\bar{y}$ and a small part $\delta y$ by $$y_m = \bar{y} + \delta y \qquad (EQ\ 20)$$

In terms of the large and small parts of the data operand and approximate inverse square root, the approximate square root x of EQ 7 can be divided into an exact part $\bar{x}$ and a small part $\delta x$. One way in which this may be accomplished is through EQS 21-24;

$$x = \bar{x} + \delta x \qquad (EQ\ 21)$$

$$\bar{x} = \bar{s}\bar{y}\left(\frac{3}{2} - \frac{1}{2}\bar{s}\bar{y}^2\right) \qquad (EQ\ 22)$$

$$Q = \bar{s}\delta y + \bar{y}\delta s \qquad (EQ\ 23)$$

$$\delta x = Q\left(\frac{3}{2} - \frac{1}{2}\bar{s}\bar{y}^2\right) - \frac{1}{2}\bar{s}\bar{y}(\bar{s}\bar{y}\delta y + \cdot Q\bar{y}) \qquad (EQ\ 24)$$

In step 26, the small part $\delta x$ is computed according to EQ 24. In the floating point representation with P fraction bits, the exact part will be computed with no error for proper choices of the large parts of the data operand and the approximate inverse square root. One choice is to let $\bar{s}$ be obtained by truncating s after a number k of bits and to let $\bar{y}$ be obtained by truncating $y_0$ after a number n of bits. Further let a number r be the smaller of the number of accurate bits in the initial approximation $y_0$ and n. Provided that $$2k + 3n + 2 \geq P \text{ (tm)} \qquad EQ\ 25)$$

the result obtained from EQ 22 by the floating point arithmetic will be an exact representation of the number $\bar{x}$. With these truncations the ratios $$\left|\frac{\delta s}{\bar{s}}\right| \approx 2^{-k} \text{ and } \left|\frac{\delta y}{\bar{y}}\right| \approx 2^{-r}$$

are small. The small part $\delta x$ is indeed smaller than the exact part $\bar{x}$. Indeed, to first order in $$\frac{\delta s}{\bar{s}} \text{ and } \frac{\delta y}{\bar{y}},$$

$$\frac{\delta x}{\bar{x}} \approx \frac{1}{2}\frac{\delta s}{\bar{s}} \qquad (EQ\ 26)$$

This means that the most significant bit of $\delta x$ will be about k+1 bits to the right of the most significant bit of $\bar{x}$. By representing the quantity x as the sum of $\bar{x}$ and $\delta x$, a total of approximately P+k+1 bits of accuracy are maintained, even though the floating point representation is capable of only P bits of accuracy. It is the representation of x by more than one floating point number, in this case the two floating point numbers $\bar{x}$ and $\delta x$, which allows an efficient computation of x', x", or x''' according to the rounding mode.

In step 28, the exact part $\bar{x}$ and the small part $\delta x$ are added together to form a sum and an alteration is performed on the sum to create an altered sum. The altered sum is to be representable in the floating point format. The way in which the alteration is performed is dependent on the rounding which is desired for the square root result. If the square root result is to be rounded to nearest, the altered sum is to be formed by rounding the exact sum toward zero. The altered sum is therefore the quantity x' of EQ 9. If the square root result is to be rounded toward zero, the altered sum is to be formed by rounding the exact sum to nearest, and the altered sum is therefore the quantity x" of EQ 13. If the square root result is to be rounded toward zero, the altered sum is to be formed by rounding the exact sum to nearest, and the altered sum is therefore the quantity x''' of EQ 16.

In step 30, the altered sum is selectively manipulated to generate the correctly rounded square root result.

If the square root result is to be rounded to nearest, the correct result z is either x' or $x' + \epsilon$. To determine which is the correctly rounded result, it suffices to compare s with $x'(x' + \epsilon)$. If s is larger, then the correctly rounded result is $x' + \epsilon$; otherwise the correctly rounded result is x'. For step 30 in this case, a comparison is made between the square root operand s and the product $x'(x' + \epsilon)$. If s is larger, the altered sum x' is manipulated by adding $\epsilon$ to it to obtain the square root result z. Otherwise, the square root result z is x'.

If the square root result is to be rounded toward zero, the correct result z is either x" or $x" - \epsilon$. To determine which is the correctly rounded result, it suffices to compare s with $x''^2$. If s is not smaller, then the correctly rounded result is x"; otherwise the correctly rounded result is $x" - \epsilon$. For step 30 in this case, a comparison is made between the square root operand s and the product $x''^2$. If s is smaller, the altered sum x" is manipulated by subtracting $\epsilon$ from it to obtain the square root result z. Otherwise the square root result z is x".

If the square root result is to be rounded up, the correct result z is either x''' or $x''' + \epsilon$. To determine which is the correctly rounded result, it suffices to compare s with $x'''^2$. If s is larger, then the correctly rounded result is $x''' + \epsilon'$; otherwise the correctly rounded result is x'''. For step 30 in this case, a comparison is made between the square root operand s and the product $x'''^2$. If s is larger, the altered sum x''' is manipulated by adding $\epsilon'$ to it to obtain the square root result z. Otherwise, the square root result z is x'''.

The manipulation in step 30 may profitably be performed in some floating point representations by treating the bit sequences representing the floating point numbers as integers. For such floating point representations, the addition or subtraction of $\epsilon$ or $\epsilon'$ to a number may be performed as the integer addition or subtraction of 1 to the least significant bit position of the bit sequence representing the number.

In some instances, it is desirable to determine whether the rounded square root result is an exact square root of the data operand. This may be determined by multiplying the square root result by itself to form a product and comparing the product with the data operand.

Again, in some instances, it is desirable to determine whether the rounded square root result is a result obtained by rounding up the exact square root of the data operand. In the round-down rounding mode, the answer is no. In the round-up mode, the answer is yes if the rounded square root result is not the exact square root of the data operand. In the round-to-nearest mode, if the rounded square root result is the exact square root of the data operand, the answer is no. If not, one can perform a calculation of the round-up square root result of the data operand. If that result is identical with the round-to-nearest square root result, then the answer is yes; otherwise the answer is no.

In step 32, the selectively manipulated result z which represents the correctly rounded square root result is provided as the result of the square root operation. This result is representable in the floating point format.

In step 34, the data processor has the result of the square root operation and may store it in a memory, store it in a register, or make other use of the result.

Figure 2:
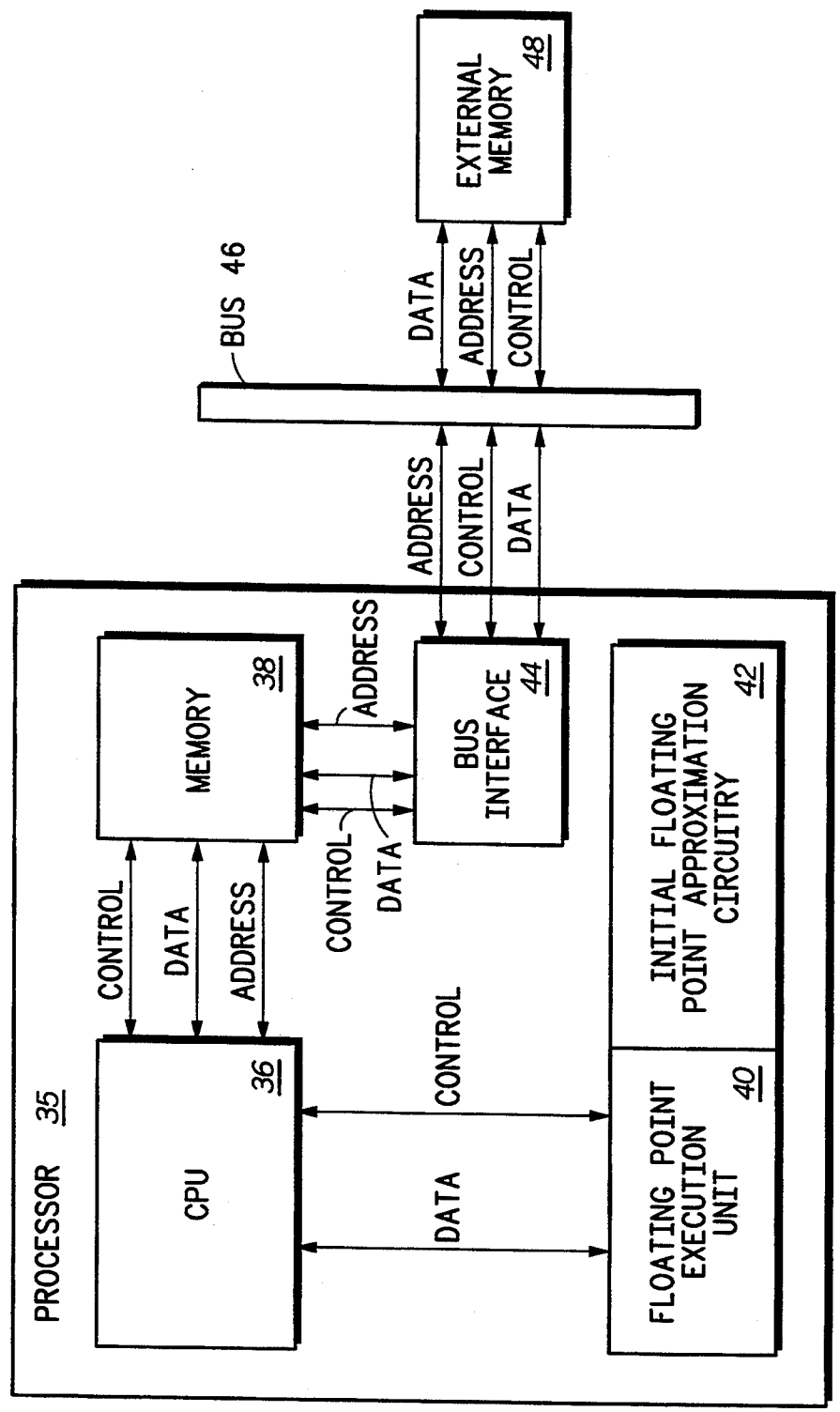
FIG. 2 illustrates, in block diagram form, a data processor for performing a floating point operation in accordance with the present invention.

FIG. 2 illustrates a data processor 35 which is used to perform a square root calculation in accordance with FIG. 1. The data processor 35 contains a central processing unit (CPU) 36. The CPU 36 may be a reduced instruction set computer (RISC), a complex instruction set computer (CISC), a digital signal processor (DSP), a microcontroller, or the CPU 36 may have some other architecture. It fetches a set of instructions from a memory 38. The set of instructions are decoded in the CPU 36 and executed by the CPU 36 or under control of the CPU 36 by a floating point execution unit 40 or some other execution unit. The instructions may be executed serially in a serial architecture or in an altered order or in parallel in a superscalar or parallel architecture.

The CPU 36 controls the memory 38 through a set of one or more control lines, a set of one or more address lines, and a set of one or more data lines. The set of address lines are used by the CPU 36 to select a particular memory location. The set of data lines are used to transmit from the CPU 36 to the memory 38 a value to be stored at the particular memory location or to transmit from the memory 38 to the CPU 36 a value which is stored at the particular memory location. The control lines are used by the CPU 36 and the memory to ensure that the value is transmitted in the proper direction in a timely fashion. The value transferred from the memory 38 to the CPU 36 may be interpreted by the CPU 36 as an instruction or as a data operand. In some implementations, the memory 38 which the CPU 36 accesses for instruction values may be logically or physically separated from the memory 38 which the CPU access for data operand values.

There may be multiple floating point units 40. The floating point execution unit 40 may possibly be included within the CPU 36. The floating point execution unit 40 is capable of carrying out floating point addition, subtraction, and multiplication. The different arithmetic operations of addition, subtraction, and multiplication may be carried out in separate floating point execution units. At least one control line and one data line allow the CPU 36 to control the floating point execution unit 40 and to transmit the data operand and possibly other values to the floating point execution unit 40. The CPU 36 or the floating point execution 40 may have a set of registers capable of holding floating point values. A data operand or set of data operands used by the floating point execution unit is read or are read from the registers and a result computed by the floating point execution unit is written to the registers.

The floating point units 40 may incorporate a circuit 42 which can generate an approximate inverse square root of a data operand. The circuit 42 might consist of a table lookup with some additional logic circuits to perform exponent shifts or might consist of a more general logic circuitry.

The memory 38 may be a cache memory internal to the data processor 36 or it may be a memory 48 external to the data processor. FIG. 2 illustrates the case in which the memory 38 is a cache memory internal to the data processor. In that case, a data value is transferred between the memory 38 and the external memory 48 through a bus interface 44 and a bus 46. A set of one or more control lines, a set of one or more address lines, and a set of one or more data lines between the memory 38 and the bus interface 44, a set of one or more control lines, a set of one or more address lines, and a set of one or more data lines between the bus interface 44 and the bus 46, and a set of one or more control lines, a set of one or more address lines, and a set of one or more data lines between the bus 46 and the external memory are used to ensure that a data value to be transferred in either direction between the memory 38 and the external memory 48 is transferred in the proper direction in a timely fashion. The bus 46 may also be attached to an alternative user or supplier of data, such as an input-output device (not illustrated).

The method illustrated in FIG. 1 may be executed in the processor 35 illustrated in FIG. 2. In the course of normal operations, the CPU 36 is fetching instructions and data values from the memory 38 and executing instructions, while the bus interface unit 44 is ensuring that the values in the memory 38 are kept consistent with the values in the external memory 48. Step 10 of FIG. 1 occurs at a point when a square root is about to be computed within the processor 35.

In step 12 of FIG. 1, the CPU 36 fetches an instruction to compute a properly rounded square root of a data operand from the memory 38. The data operand may already be present in a register in the floating point execution unit 40 or in the CPU 36, or the data operand may also be fetched from the memory 38. The CPU 36 decodes the instruction analogous to step 14 of FIG. 1. In step 16 of FIG. 1, the CPU 36 signals an exception which causes a new stream of instructions to compute the square root to be fetched from the memory 38. The stream of instructions may save certain features of the state of the processor 35 which will be restored after the square root operation has been completed. The saving of this information may be implemented by transferring state information to a memory device such as memory 38 and/or 38.

In step 18 of FIG. 1, the data operand is used either by the CPU 36 or directly by the circuit 42 to produce an approximate inverse square root $y_0$. In steps 20 and 22, this approximate square root is used as a starting value for a sequence of zero or more quadratic iterations described by EQ 3, cubic iterations described by EQ 4, or other iterations to generate a more exact approximate inverse square root $y_m$ using addition, subtraction, and/or multiplication within unit 40. The arithmetic operations implicit in EQ 3 and EQ 4 are executed in the floating point execution unit 40 under the control of the CPU 36. The number of iterations may be determined in advance or by actually checking the accuracy after some iterations.

In step 24 of FIG. 1, the large part of the approximate inverse square root $\bar{y}$, the small part of the approximate inverse square root $\delta y$ the large part of the data operand $\bar{s}$ and the small part of the data operand s are used to compute the exact part $\bar{x}$ according to EQ 22. The generation of these terms may occur partly in the CPU 36 and partly in the floating point execution unit 40; in general, the floating point arithmetic implicit in EQ 22 is likely to be performed in the floating point execution unit 40, while the separation of the data operand and the approximate inverse square root into the large and the small parts may be done in the CPU 36. As stated previously, the CPU 36 controls the operation of the floating point execution unit 40.

In step 26 of FIG. 1, the floating point execution unit 40 under the control of the CPU 36 performs arithmetic operations to compute δx according to EQS 23 and 24. Then in step 28, the $\bar{x}$ computed in step 24 and the δx computed in 26 are added and the result altered by rounding as described below via EQ 27, according to the way in which the square root is to be rounded. Then a comparison is made, as described, to determine whether or not the altered result is to be manipulated to produce the properly rounded result z. The arithmetic operations needed to perform the comparison are performed in the floating point execution unit 40 under the control of the CPU 36. The arithmetic operations needed to manipulate the altered sum (i.e. add in a constant of $-1, 0, \text{or} +1$), if needed, may be performed either in the CPU 36 or in the floating point execution unit 40.

The CPU 36 then provides the square root result in a register in the CPU 36 or the floating point execution 40 or in memory 38. Any required restoration of the process state is performed. This restoration may involve the transfer of data values between the memory 38 and the CPU 36 and the floating point execution unit 40.

Figure 3:
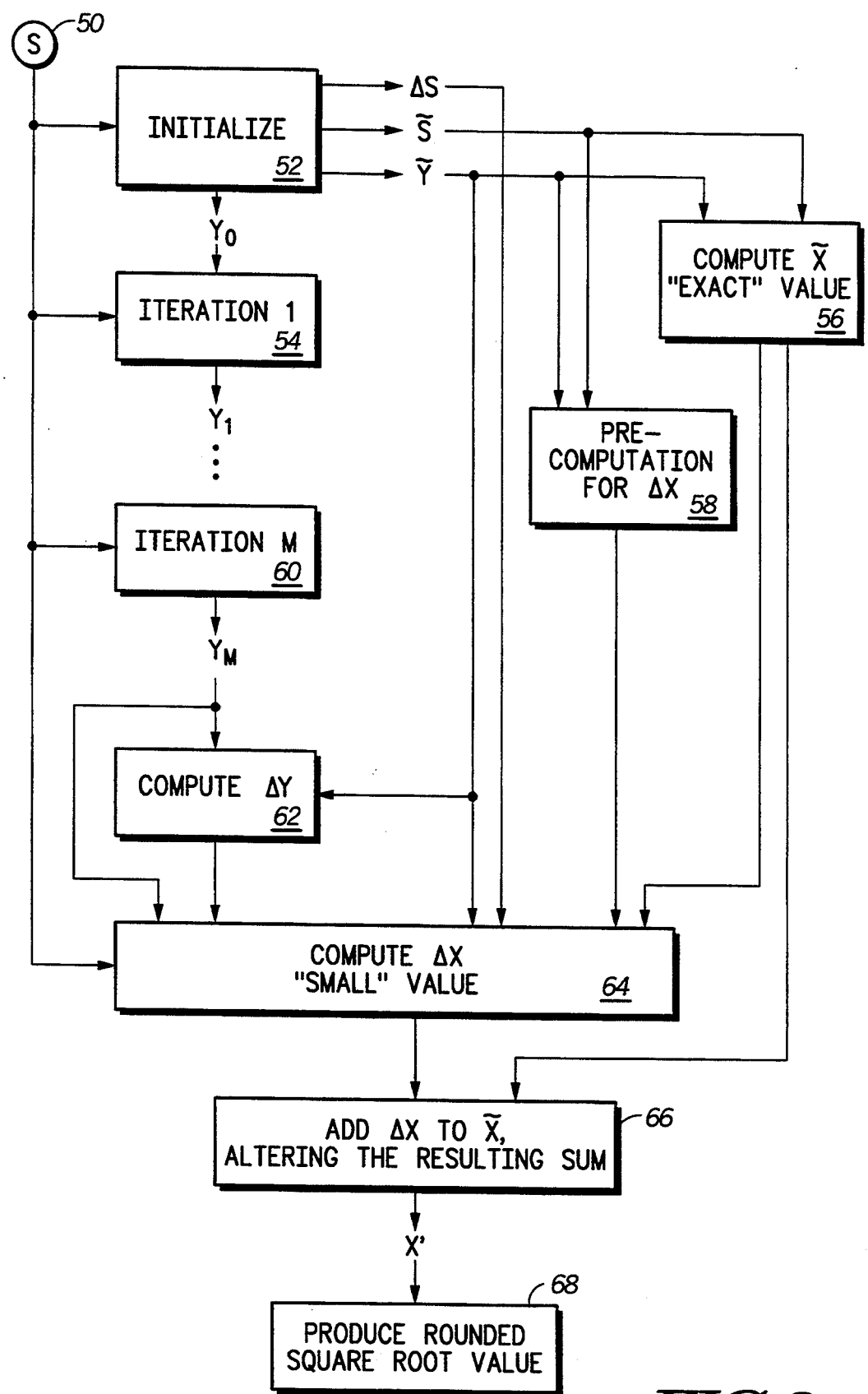
FIG. 3 illustrates, in a data flow diagram, an order for calculating various data processing values in order to perform a floating point square root operation in accordance with the present invention.

FIG. 3 illustrates a data flow for the method and data processor of FIGS. 1 and 2 in the calculation of a square root of an operand s 50. Calculation 52 accepts the operand 50 and generates the terms $\bar{s}$, δs, $y_0$, and $\bar{y}$. Let $\bar{s}$ have exactly k significant bits of accuracy and $\bar{y}$ have exactly n significant bits of accuracy. EQ 25 shows that the computation of $\bar{x}$ will be exact provided that $2k+3n+2 \geq P$. It may be a convenience to have $k \approx n$, although EQ 26 shows that δx is much more sensitive to $$\frac{\delta s}{\bar{s}} \text{ than to } \frac{\delta y}{\bar{y}}.$$

A satisfactory approach is to let $$k = n = \left\lfloor \frac{P-2}{5} \right\rfloor \qquad \text{(EQ 27)}$$

Wherein [B] means round the value B to the nearest integer less than or equal to B. Also, let $\bar{s}$ be obtained from s by truncating it after k significant bits. The value $y_0$ may be obtained in hardware or by means of a table lookup (e.g. a ROM table lookup). The operand 50 may be written as $$s = 2^{2t} \times f \qquad \text{(EQ 28)}$$

where t is an integer and $\frac{1}{2} \leq f \leq 2$ is a real number. Then an initial approximate inverse square root value $y_0$ can be obtained as $$y_0 = 2^{-t} \times g \qquad \text{(EQ 29)}$$

where g is an approximate inverse square root of f. The g may be obtained from a table. The advantage of this approach is that the table needs far fewer values if it only needs to give approximate inverse square root values for numbers between $\frac{1}{2}$ and 2 than if it needs to cover a wider dynamic range. The large part $\bar{y}$ be obtained by truncating $y_0$ to k significant bits. Of course, no truncation is needed if $y_0$ already has no more than k significant bits. The quantity δs can be computed via $$\delta s = s - \bar{s} \qquad \text{(EQ 30)}$$

which is consistent with EQ 19.

A sequence of zero or more iterations shown in FIG. 3 as calculation 54 and continuing up to calculation 60 generate more accurate approximate inverse square roots resulting finally in the value $y_m$. Each of these iterations may be a quadratic iteration calculation as in EQ 3, a cubic iteration calculation as in EQ 5, or some other iteration which results in a more accurate approximate inverse square root. Not all iterations need to be of the same type. It is likely but not necessarily most efficient to perform the same number of iterations for all arguments. For a given processor 35, the accuracy of the initial inverse approximate square root, the number of significant bits P in the floating point representation, the number of iterations and the type of each iteration, and the capabilities of the CPU 36 and the floating point execution unit 40 will be considerations in determining the number of iterations and the type of each iteration. The other constraint is that the final approximate inverse square root $y_m$ needs at least $$\frac{P}{2}$$

significant bits so that the computation in calculations 56 and 64 will provide a sufficiently accurate representation of x as described by EQS 10, 14, and 17. Overall, calculations 54 and subsequent iterations up to calculation 60 encompass steps 20 and 22 of FIG. 1.

Calculation 56 which computes the exact part $\bar{x}$ and calculation 58 which computes some terms used in calculation 64 may be done in parallel with the iteration calculations 54 and 60. Particularly in a superscalar architecture, there is an advantage to doing these calculations in parallel with the iterations. Calculation 56 computes the left-hand side of EQ 22, while calculation 58 computes some terms which appear in EQ 24. As an example, the terms $\bar{s}\bar{y}$ and $\frac{1}{2}\bar{s}\bar{y}$ can be computed in calculation 56. In a particular implementation for a particular processor, the designer should attempt to optimize performance. Calculation 56 is described by step 24 of FIG. 1.

As soon as $y_m$ has been calculated by calculation 60, calculation 62 gives $$\delta y = y_m - \bar{y} \qquad \text{(EQ 31)}$$

which satisfies EQ 20.

Calculation 64 computes δx using EQS 23 and 24. The inputs to this calculation are obtained from operand 50 and calculations 52, 56, 58, 60, and 62. The precomputation in calculation of some terms in EQS 23 and 24 reduces the computation which must be done in calculation 64. At the conclusion of calculation, the work described by EQ 24 has been completed.

In calculation 66, the exact part and the small part are added as shown in EQ 20 with the rounding mode chosen as indicated by the discussion following EQ 26. This produces the value x', x", or x''' according to the rounding mode. Overall, calculation 66 corresponds to step 28.

In calculation 68, the selective manipulation (i.e. adding $-1, 0, \text{or} +1$ to a least significant bit position) is performed to compute the properly rounded square root value z as discussed following EQ 26. This is the value which is provided as the square root value.

Figure 4:
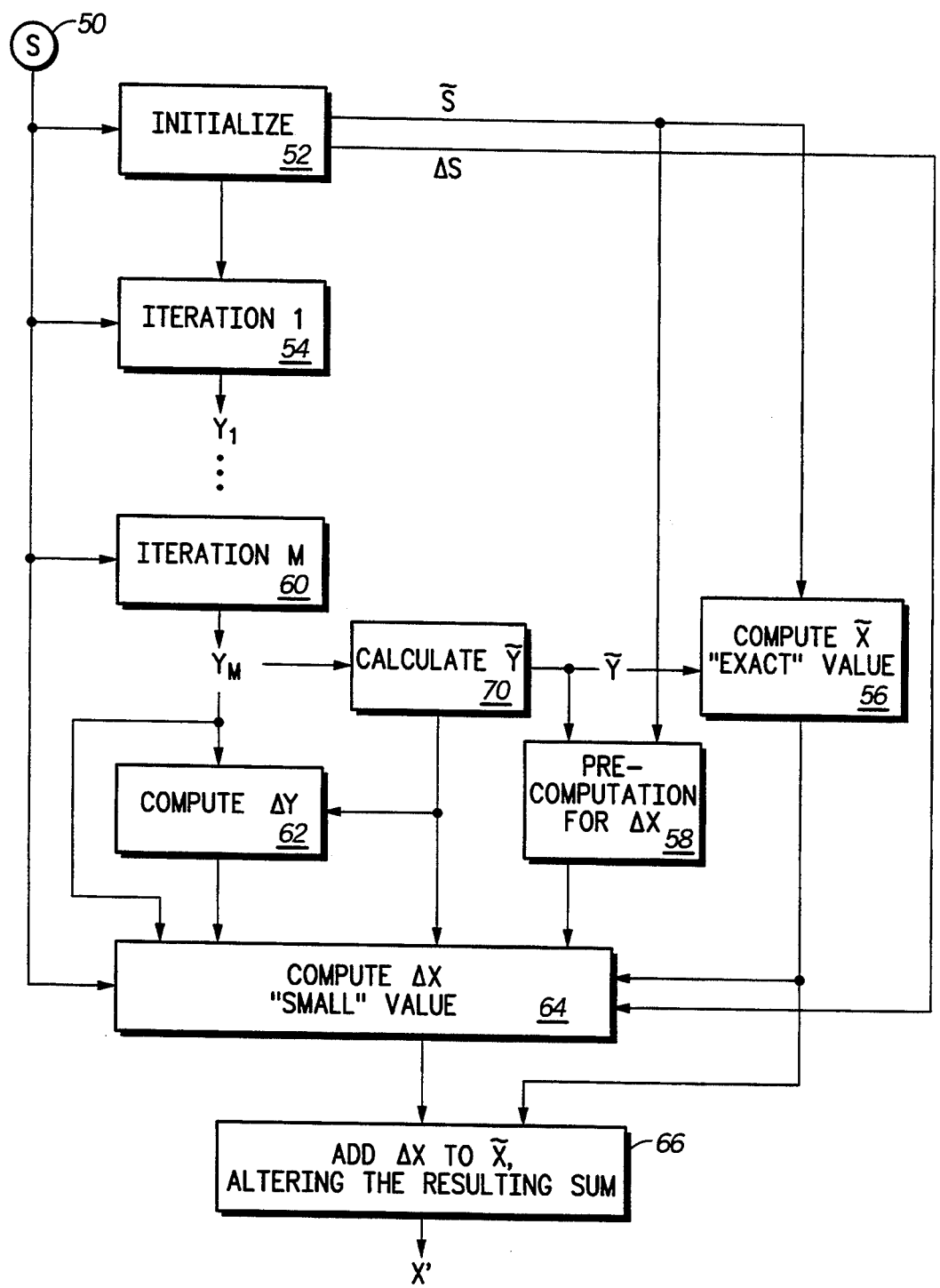
FIG. 4 illustrates, in a data flow diagram, another order for calculating various data processing values in order to perform a floating point square root operation in accordance with the present invention.

FIG. 4 shows an alternative data flow. This differs from FIG. 3 in that in calculation 70, the value $\bar{y}$ is computed from the approximate inverse square root $y_m$ instead of being computed in calculation 52 from the initial approximate inverse square root $y_0$. This is shown as an alternative data flow, although usually it will be less desirable because it delays the computation of $\bar{y}$. The amount of work which can be performed in calculation 58 is also likely to be reduced. Other generalizations of the data flow are possible.

Figure 5:
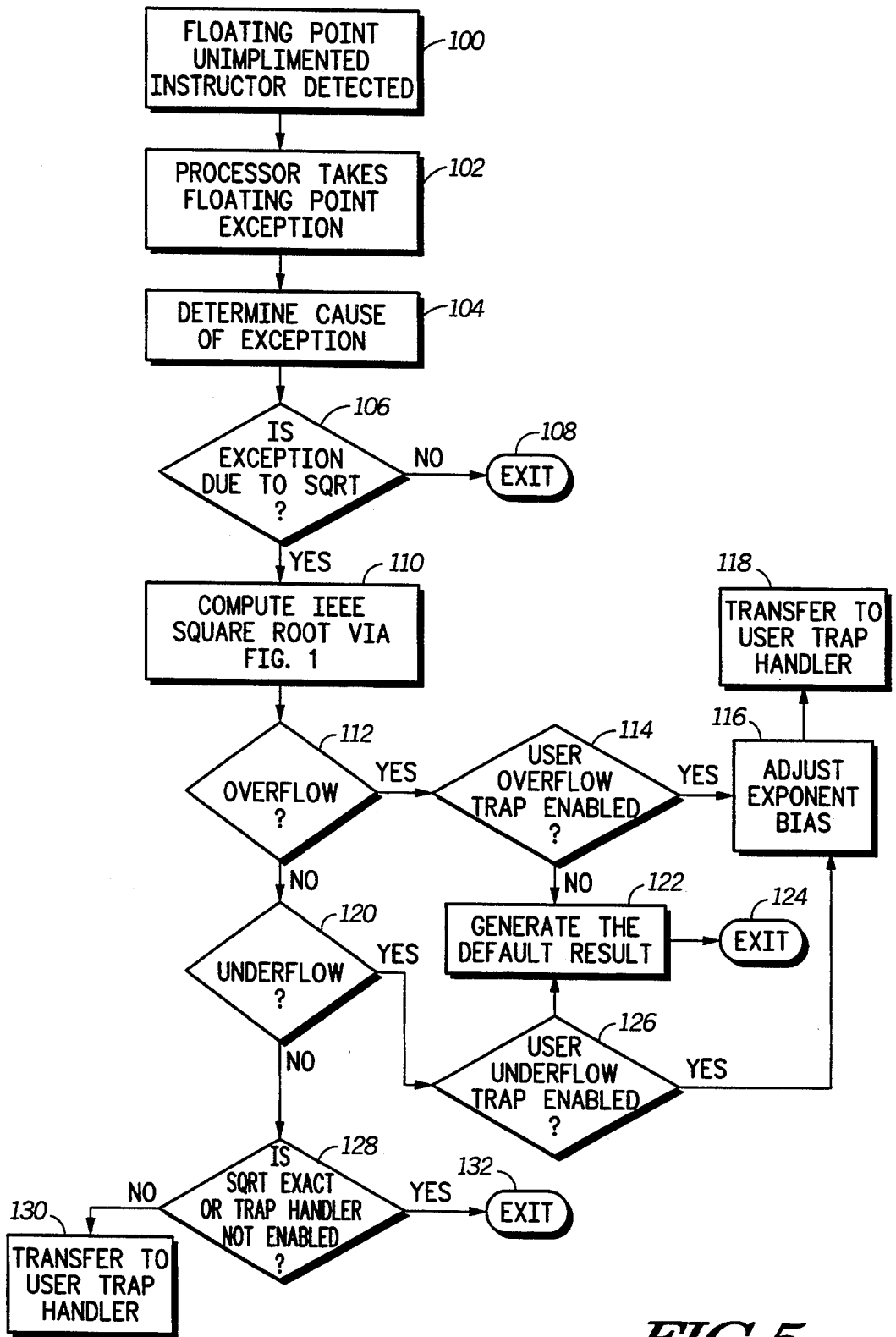
FIG. 5 illustrates, in a flowchart, a method used by a data processor to perform a square root operation in a data processing system in accordance with the present invention.

FIG. 5 is a flowchart which illustrates how the processor 35 of FIG. 2 performs a square root operation in accordance with the method of FIG. 1. FIG. 5 has a step 100 in which an unimplemented square root operation is detected by the CPU 36. In step 102, the processor takes a floating point exception after which the CPU will take a floating point exception. After saving sufficient information about the state of the processor, the instructions issued by the processor will determine the cause of the exception in step 104. In step 106, the instructions check to see if the exception was due to an instruction to take a square root of a data operand. If not, other instructions not germane to a square root calculation will have to deal with the exception in step 108.

In step 110 of FIG. 5, the processor 35 of FIG. 2 computes the square root result of a scaled data operand using the method of FIG. 1. Using this, it is possible to determine if the square root of the data operand would have caused an overflow or an underflow in a step 112. This might occur if the square root result were to be represented in a different floating point representation from the floating point representation of the data operand. Step 114 checks to see if the user has enabled an overflow exception. If the user has, then step 116 performs a rescaling so that the result returned to the user, while not the correct result, is representable as a floating point number, and in step 118 lets the user deal with the overflow. If the user has not enabled the overflow trap, a default value is generated in step 122 and returned in step 124.

If overflow is not a possibility, step 120 checks to see if underflow would have occurred. If so, step 126 checks to see if the user has enabled an underflow exception. If so, then step 116 performs a rescaling and the user is left to deal with it in step 118. If not, a default result is generated in step 122 and returned in step 124.

Step 128 determines whether the square root value is exactly the square root of the data operand or the user has not enabled, an inexact exception. If either is true, the square root value is returned in step 132. Otherwise, the user is allowed to deal with the inexactness in step 130.

Figure 6:
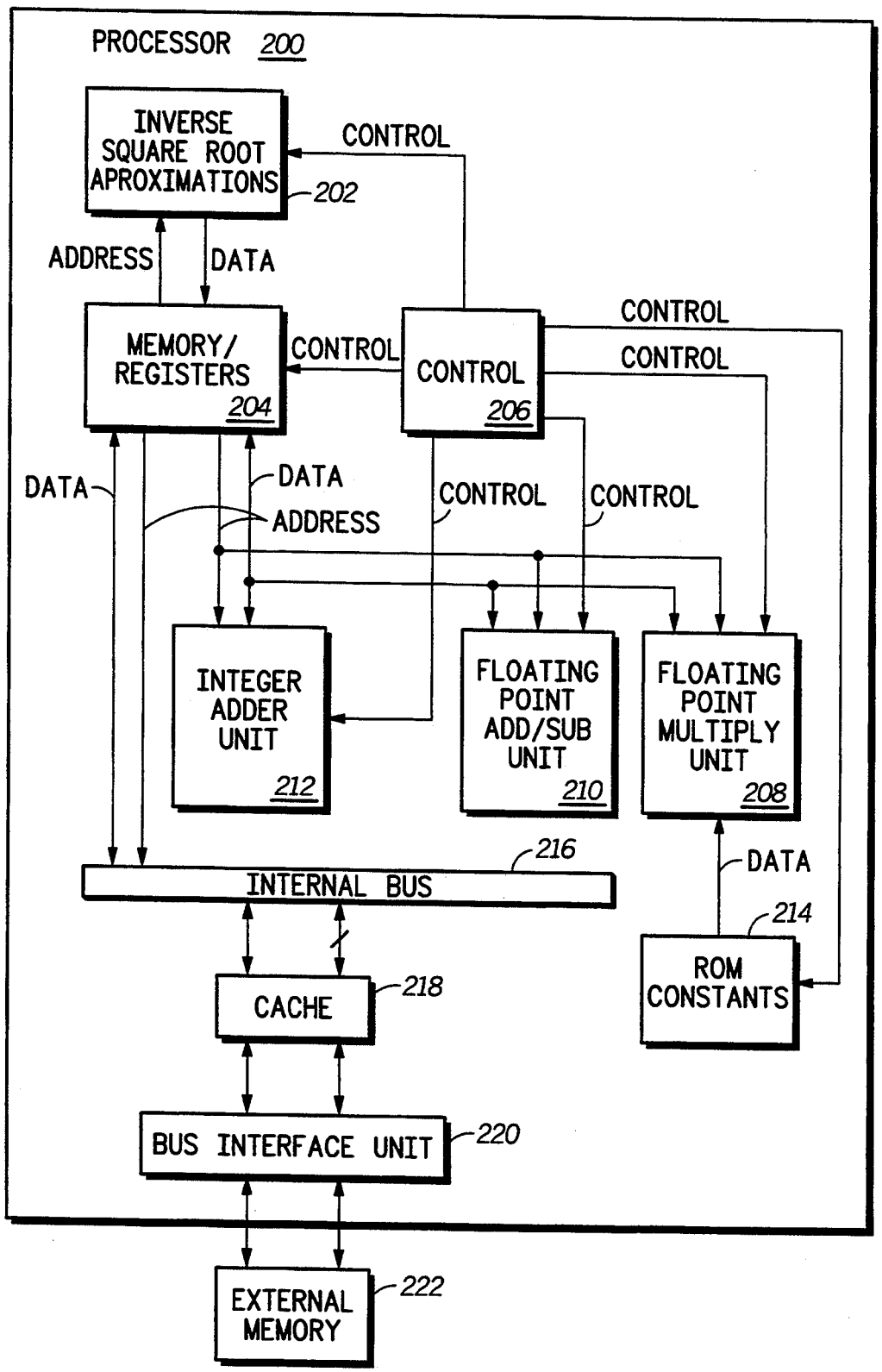
FIG. 6 illustrates, in block diagram form, a data processor for performing a floating point operation in accordance with the present invention.

FIG. 6 illustrates a processor 200 in which a square root of a data operand is computed using the method of FIG. 1 following the calculations of FIG. 3. The parts of the processor 200 are similar to those of the processor 35. The primary difference is that the CPU 36 is replaced by a control unit 206 which carries out the calculations of FIG. 3 without requiring further control. All control needed to compute the square root of the data operand is provided by control unit 206. An initial approximate inverse square root value is obtained from an inverse square root approximation unit 202 which might use a combination of table lookup with exponent manipulation as described for calculation 52 of FIG. 3. A memory/registers unit 204 holds partial results used in the calculations of FIG. 3, while one or more floating point addition/subtraction units 210 and one or more floating point multiplication units 208 are used for floating point arithmetic operations needed in the calculations of FIG. 3. An integer addition/subtraction unit 212 is used for the selective manipulation step 30 of FIG. 1. A read-only memory (ROM) provides constants needed in the calculations of FIG. 3. An internal bus 216, a cache 218, and a bus interface unit 220 provide access to an external memory 222.

The present invention provides a method and apparatus for generating a square root of a floating point number within a data processor in a fast and efficient manner. With such a method and apparatus, the square root of the floating point number may be generated reliably and quickly. In the past, a common method of producing the square root has been to use a restoring algorithm which produces one correct bit per iteration. This is easily implemented in circuitry, but is slow because it only produces one bit per iteration. The quadratic and cubic iterations described by EQ 3 and EQ 5 have the great advantage of rapid convergence, since the number of correct bits is roughly doubled or tripled with each iteration. The problem with using these equations in the past has been the final iteration of EQ 7. The difficulty in the past has been that to get a square root result with a given precision, EQ 7 has to be computed with an even greater precision, necessitating extra circuitry or a reversion to a restoring algorithm to complete the generation of the square root. The present invention circumvents this difficulty through the representation of EQ 21, in which a real number x which cannot be represented sufficiently accurately in the floating point representation of the data processor is represented as the sum of two numbers, one of which can be represented exactly in the floating point representation of the data processor and the other of which is significantly smaller.

One advantage of this invention is that fast quadratic and cubic iterations may be used which improves the speed of the square root operation. A second advantage is that the method does not require arithmetic operations with extra precision. Whatever the highest precision of arithmetic operations is, the square root can be efficiently computed to that precision. There is no inefficient transition from fast early iterations to slow final iterations. The invention is also easily incorporated within a wide range of data processors; it is suitable for RISC, CISC, and DSP processors as well as microcontrollers and special-purpose processors. Its implementation can be distributed in various ways between hardware and software. The method is also general enough to take advantage of architectural variations among processors. For example, in an implementation on superscalar processor, the multiple issue of instructions is used to great advantage. In any implementation, it takes good advantage of the floating point instructions which are implemented.

While the present invention has been shown and described with reference to specific embodiments, further modifications and improvements will occur to those skilled in the art. Examples are discussed in the following paragraphs.

Particular features of a given floating point representation may call for modifications. For example, the absence or non-use of a specific rounding mode is often easy to make up for with the rounding modes that do exist. The calculation of numbers whose value is the value of the least significant bit position can often be performed quickly for a given floating point representation by directly manipulating the bits of the number. And in many cases, the addition or subtraction of such a number to a quantity be circumvented by using integer arithmetic on the bit sequences representing the quantity.

The representation of the real number x by a pair of floating point numbers in EQ 21 is important, but these two numbers need not be computed exactly as shown by EQS 22-24. Any equivalent algebraic transformation would work as well, and even transformations made by making very small changes to the constants could give an acceptable result.

Moreover, while EQS 21-24 are based on the last iteration defined by EQ 7, other formulas for x could provide the basis for a decomposition into a new exact part and a new small part. For example, a final iteration defined by $$x = sy_m \left( \frac{15}{8} - \frac{5}{4} sy_m^2 + \frac{3}{8} (sy_m^2)^2 \right)$$ (EQ 32)

could be used as the basis for forming an exact part and a small part. The particular choice of EQ 7 has the desirable property that it requires a small amount of additional computation.

Although the model floating point representation presented used a binary representation, the use of another base for the representation could be accommodated. An even base would be slightly more convenient, because then the fractions which have appeared in the equations would all have exact representations for that base.

The determination of whether the square root result is an exact square root of the data operand may be performed in several ways. One useful observation is that if the rounded square root result has exactly b significant bits, its square has at least 2b −1 significant bits. For its square to have an exact floating point representation, it is necessary that $2b-1 \leq P$. For a particular floating point representation, it is therefore easy to make the determination of whether the square of the rounded square root result has an exact representation. If it does not, the rounded square root result is inexact. If it does, the square can be computed and has an exact representation in the particular floating point representation.

In some floating point representations, there is a special bit sequence for very small numbers usually called denormalized numbers. In a particular processor, these might not need special treatment. If they do need to be treated separately, it is convenient to scale the denormalized number to form a scaled data operand and to unscale the square root result of the scaled data operand.

It is to be understood, therefore, that this invention is not limited to the particular forms shown and that it is intended in the appended claims to cover all modifications that do not depart from the spirit and scope of this invention.

What is claimed is:

1. A method for executing a square root instruction in a data processor, the data processor having access to a memory device, means for providing an inverse square root approximation, and an exception handler, and having an execution device, the method comprising the steps of:

reading an opcode from the memory device into the execution device;

determining, via the execution device, that the opcode indicates that a square root operation is to be performed on a number; and invoking the exception handler to calculate the square root of the number wherein the square root is calculated by:

receiving an inverse square root approximation from the means for providing an inverse square root approximation;

determining a more accurate inverse square root approximation from the inverse square root approximation by executing instructions within the data processor;

using the more accurate inverse square root approximation and the number to create an exact floating point value and a small floating point value wherein the sum of the exact floating point value and the small floating point value is a substantially close approximation to the actual square root of the number; and selectively adding a constant value to a least significant bit position of the substantially close approximation in order to numerically adjust the actual square root of the number.

2. The method of claim 1 wherein the step of selectively adding comprises:

adding a logic value to a least significant bit position of the substantially close approximation, the logic value being a binary value selected form the group consisting of: −1, 0 and 1.

3. The method of claim 1 wherein the step of receiving the inverse square root approximation comprises:

using an iterative process within the means for providing an inverse square root approximation to determine the inverse square root approximation.

4. The method of claim 1 wherein the step of receiving the inverse square root approximation comprises:

using an iterative quadratic convergence process within the means for providing the inverse square root approximation to determine the inverse square root approximation.

5. The method of claim 4 wherein the quadratic convergence process comprises the steps of:

(a) providing an initial approximation of the inverse square root;

(b) calculating a more accurate inverse square root approximation ($y_n$) from the prior inverse square root approximation ($y_{n-1}$) using the equation:

$$y_n = y_{n-1}(a - b^* s^*(y_{n-1})^2)$$

wherein:

s is equal to the number having an exact mathematical square root, a is a first constant, and b is a second constant;

(c) iterating step (b) by setting $y_n$ calculated from step (b) to $y_{n-1}$ and calculating a new $y_n$ from step (b) until a predetermined number of bits of precision are attained for $y_n$ in step (b); and (d) using a last calculated $y_n$ as the inverse square root approximation.

6. The method of claim 1 wherein the step of receiving the inverse square root approximation comprises:

using an iterative cubic convergence process to determine the inverse square root approximation.

7. The method of claim 6 wherein the cubic convergence process comprises the steps of:
(a) providing an initial approximation of the inverse square root;
(b) calculating a more accurate inverse square root approximation ($y_n$) from the prior approximation ($y_{n-1}$) using the equation:

$$y_n = y_{n-1}(a - b*s*(y_{n-1})^2 + c*(s*(y_{n-1})^2)^2)$$

wherein:
s is equal to the number having an exact mathematical square root,
a is a first constant,
b is a second constant, and
c is a third constant;
(c) iterating step (b) by setting $y_n$ calculated from step (b) to $y_{n-1}$ and calculating a new $y_n$ from step (b) until a predetermined number of bits of precision are attained for $y_n$; and
(d) using a last calculated $y_n$ as the inverse square root approximation.

8. The method of claim 1 wherein the step of receiving the inverse square root approximation comprises:
generating the inverse square root approximation within the means for providing the inverse square root approximation by using a method selected from the group consisting of: iterative quadratic convergence process, an iterative cubic conversion process, and a combination of both a quadratic process and cubic process.

9. A data processor for calculating a square root of a number, the data processor comprising:
an execution device for processing data within the data processor;
means for approximating an inverse square root of the number coupled to the execution device;
a memory device which stores a first binary value and a second binary value wherein the first binary value, when decoded by the execution device, indicates that a square root operation is to be performed on the second binary value; and
means for processing the square root operation coupled to the execution device, the means for processing receiving an inverse square root approximation from the means for approximating an inverse square root approximation, providing a more accurate inverse square root approximation from the inverse square root approximation, using the more accurate inverse square root approximation and the number to create an exact floating point value and a small floating point value wherein the sum of the exact floating point value and the small floating point value is a substantially close approximation to the actual square root of the number, and selectively adding a constant value to a least significant bit position of the substantially close approximation in order to more accurately represent the actual square root of the number.

10. The method of claim 9 wherein the inverse square root approximation is read from a memory look-up table within the data processor.

11. A data processing system for performing floating point operations, the data processing system being coupled to an external memory device, the data processing system comprising:

a memory storage array within the data processing system for storing data within the data processing system;
a control unit coupled to the memory storage array and coupled to the external memory device, the control unit processing data and computer instructions stored in the memory storage array and the external memory device, the control unit selectively reading the data and the computer instructions from the memory storage array and generating control signals and providing floating point data for use within the data processing system;
a floating point execution unit coupled to the control unit for receiving the floating point data and control signals, the floating point execution unit being capable of performing floating point mathematical operations using the floating point data, the floating point unit generating a first floating point value in response to the receipt of at least one of the control signals, the first floating point value being an adjusted approximate inverse square root of the floating point data, the floating point execution unit performing a sequence of operations to improve the precision of the first floating point value, the floating point execution unit using the first floating point value to generate a second floating point value which is an exact floating point number and a third floating point number which is significantly less than the second floating point number wherein the addition of the second floating point number and the third floating point number provides a P-bit accurate square root approximation to the floating point data wherein P is a number of significant floating point bit positions available within the data processing system, the floating point execution unit providing the P-bit accurate square root approximation as a square root value output to the control unit.

12. A method for performing a floating point operation in a data processing system, the data processing system having a control unit, a means for storing data coupled to the control unit, and a floating point execution unit coupled to the control unit, the method comprising:
reading, by the control unit, a computer operation and a data operand from the means for storing data;
decoding the computer operand, by the control unit, to determine that the floating point execution unit is to be accessed in order to perform the computer operation, the computer operation being a square root operation;
transmitting at least one control signal and the data operand from the control unit to the floating point exception unit;
providing, by the floating point execution unit in response to the at least one control signal, a first floating point value wherein the first floating point value is an adjusted approximation of an inverse square root of the data operand wherein the data operand has a precise mathematical square root;
iterating, at least once, through a plurality of floating point operations within the floating point execution unit, the plurality of floating point operations being used to improve the precision of the first floating point value until a predetermined precision of the first floating point value is achieved;
generating from the first floating point value a first value and a second value, the first value being an exact floating point value which is represented in P bits with no loss of significant bits wherein P is a finite integer greater than zero and is the number of floating point bits used within the data processing to represent floating point values, the second value being a small floating point value which is significantly less than the exact floating point value;

adding the exact floating point value and the small floating point value together within the floating point execution unit to form an accurate approximate square root of the data operand;

performing a calculation within the floating point execution unit to determine whether the accurate approximate square root needs to be numerically adjusted; and selectively adjusting the accurate approximate square root in the floating point execution unit by selectively adding a constant to at least a least significant bit position of the accurate approximate square root to numerically adjust the accurate approximate square root.

13. The method of claim 12 wherein the step of selectively adjusting comprises:

either adding or subtracting a logic one to a least significant bit position of the accurate approximate square root to numerically adjust the accurate approximate square root.

14. The method of claim 12 wherein the step of providing, by the floating point exception unit in response to the at least one control signal, a first floating point value wherein the first floating point value is an adjusted approximation of an inverse square root of the computer operand comprises:

using an iterative process to determine the first floating point value.

15. The method of claim 12 wherein the step of providing, by the floating point exception unit in response to the at least one control signal, a first floating point value, comprises:

using an iterative quadratic convergence process to determine the first floating point value.

16. The method of claim 15 wherein the iterative quadratic convergence process comprises the steps of:

(a) providing an initial adjusted approximation to the inverse square root of the data operand;

(b) calculating a more accurate adjusted approximation $(y_n)$ from the prior adjusted approximation $(y_{n-1})$ using the equation:

$$y_n = y_{n-1}(a - b^* s^* (y_{n-1})^2)$$

wherein:
 s is equal to the data operand having a precise mathematical square root,
 a is a first constant, and
 b is a second constant;

(c) iterating step (b) by setting $y_n$ calculated from step (b) to $y_{n-1}$ and calculating a new $y_n$ from step (b) until a predetermined number of bits of precision are attained for $y_n$ in step (b); and (d) using a last calculated $y_n$ as the first floating point value.

17. The method of claim 16 wherein step (b) further comprises:

setting the constant a equal to a number substantially equal to 3/2; and setting the constant b equal to a number substantially equal to ½.

18. The method of claim 12 wherein the step of providing, by the floating point exception unit in response to the at least one control signal, the first floating point value, comprises:

using an iterative cubic convergence process to determine the first floating point value.

19. The method of claim 18 wherein the cubic convergence process comprises the steps of:

(a) providing an initial adjusted approximation for the inverse square root of the data operand;

(b) calculating a more accurate adjusted approximation $(y_n)$ from the prior adjusted approximation $(y_{n-1})$ using the equation:

$$y_n = y_{n-1}(a - b^* s^* (y_{n-1})^2 + c^*(s^*(y_{n-1})^2)^2)$$

wherein:
 s is equal to the number having an exact mathematical square root,
 a is a first constant,
 b is a second constant, and
 c is a third constant;

(c) iterating step (b) by setting $y_n$ calculated from step (b) to $y_{n-1}$ and calculating a new $y_n$ from step (b) until a predetermined number of bits of precision are attained for $y_n$; and (d) using a last calculated $y_n$ as the first floating point value.

20. The method of claim 19 wherein step (b) further comprises:

setting the constant a equal to a number substantially equal to 15/8;

setting the constant b equal to a number substantially equal to 5/4; and setting the constant c equal to a number substantially equal to ⅜.

21. A method for performing a floating point operation within a data processing system, the data processing system having a central processing unit, a storage device, and circuitry for processing floating point operations, the method comprising:

transmitting a number having an exact mathematical square root from the storage device to the central processing unit via a data bus, the number having a floating point representation within the data processing system;

determining, by a decoding process in the central processing unit, that the data processing system is requesting that the square root of the number be calculated;

transmitting the number from the central processing unit to the circuitry for processing floating point operations;

generating and storing an approximate inverse square root of the number within the circuitry for processing floating point operations wherein the approximate inverse square root has more than P/2 bits of precision where P is a finite integer greater than zero and equals the number of significant bits in the floating point representation;

providing an exact component value via the circuitry for processing floating point operations, the exact component value being generated from the number and the approximate inverse square root wherein the exact component value has a precise representation in the floating point representation;

providing, via the circuitry for processing floating point operations, a small component value generated from the number and the approximate inverse square root wherein the small component value is significantly less than the exact component value, the sum of the exact component value and the small component value differs from the exact mathematical square root by less than one half of a value of a least significant bit position of the sum;

generating a trial value using the circuitry for processing floating point operations, the trial value is generated by adding the exact component value to the small component value wherein the trial value is altered to be representable in P bits; and selecting either the trial value or the trial value plus a constant as the square root of the number and providing the square root of the number within the data processing system.

22. The method of claim 21 wherein the step of selecting either the trial value or the trial value plus the constant comprises:

calculating the trial value plus the constant as being the trial value wherein a logic one is added to the least significant bit position of the trial value.

23. The method of claim 21 wherein the step of generating and storing the approximate inverse square root of the number comprises:

using an iterative process to determine the approximate inverse square root.

24. The method of claim 21 wherein the step of generating and storing the approximate inverse square root of the number comprises:

using an iterative quadratic convergence process to determine the approximate inverse square root.

25. The method of claim 24 wherein the quadratic convergence process comprises the steps of:

(a) providing an initial approximation of the inverse square root;

(b) calculating a more accurate inverse approximation ($y_n$) from the prior inverse approximation ($y_{n-1}$) using the equation:

$$y_n = y_{n-1}(a - b^* s^* (y_{n-1})^2)$$

wherein:
s is equal to the data operand having a precise mathematical square root,
a is a first constant, and
b is a second constant;

(c) iterating step (b) by setting $y_n$ calculated from step (b) to $y_{n-1}$ and calculating a new $y_n$ from step (b) until a predetermined number of bits of precision are attained for $y_n$ in step (b); and (d) using a last calculated $y_n$ as the first floating point value.

26. The method of claim 25 wherein step (b) further comprises:

setting the constant a equal to a number substantially equal to 3/2; and setting the constant b equal to a number substantially equal to ½.

27. The method of claim 21 wherein the step of generating and storing the approximate inverse square root of the number comprises:

using an iterative cubic convergence process to determine the approximate inverse square root of the number.

28. The method of claim 21 wherein the cubic convergence process comprises the steps of:

(a) providing an initial approximation of the inverse square root;

(b) calculating a more accurate adjusted approximation ($y_n$) from the prior adjusted approximation ($y_{n-1}$) using the equation:

$$y_n = y_{n-1}(a - b^* s^* (y_{n-1})^2 + c^* (s^* (y_{n-1})^2)^2)$$

wherein
s is equal to the number having an exact mathematical square root,
a is a first constant,
b is a second constant, and
c is a third constant;

(c) iterating step (b) by setting $y_n$ calculated from step (b) to $y_{n-1}$ and calculating a new $y_n$ from step (b) until a predetermined number of bits of precision are attained for $y_n$; and (d) using a last calculated $y_n$ as the first floating point value.

29. The method of claim 28 wherein step (b) further comprises:

setting the constant a equal to a number substantially equal to 15/8;

setting the constant b equal to a number substantially equal to 5/4; and setting the constant c equal to a number substantially equal to ⅜.

30. The method of claim 21 wherein the step of providing an exact component value comprises:

calculating a first value ($\tilde{s}$) having having a number k of significant bits wherein k is a positive integer less than P and small enough to calculate the exact component value without rounding error, the first value ($\tilde{s}$) being said number having an exact mathematical square root altered to include only k significant bits; and using the first value ($\tilde{s}$) to calculate the exact component without rounding error.

31. The method of claim 21 wherein the step of providing the exact component value comprises:

calculating a first value ($\tilde{y}$) having a number n of significant bits wherein n is a positive integer less than P and small enough to calculate the exact component value without rounding error, the first value ($\tilde{y}$) being the approximate inverse square root value altered to include only n significant bits; and using the first value ($\tilde{y}$) to calculate the exact component value without rounding error.

32. The method of claim 21 wherein the step of providing the exact component value comprises:

calculating a first value ($\tilde{y}$) having a number n of significant bits wherein n is a positive integer less than P and small enough to calculate the exact component value without rounding error, the first value ($\tilde{y}$) being the approximate inverse square root value altered to include only n significant bits;

calculating a second value ($\tilde{s}$) having a number k of significant bits wherein k is a positive integer less than P and small enough to calculate the exact component value without rounding error, the second value ($\tilde{s}$) being said number having an exact mathematical square root altered to include only k significant bits; and using the first value ($\tilde{y}$) and the second value ($\tilde{s}$) to calculate the exact component value without rounding error.

33. The method of claim 32 wherein the step of calculating the first value (ȳ) and the step of calculating the second value (s̄) comprise:

using a quadratic convergence equation to calculate the exact component value wherein $2k+3n+2 \leq P$.

34. The method of claim 32 wherein the step of calculating a first value (ȳ) and the step of calculating a second value (s̄) comprise:

using the following quadratic convergence equation to calculate the exact component value (x̄):

$$\bar{x} = \bar{s} * \bar{y}(a - b * \bar{s} * \bar{y}^2).$$

35. The method of claim 34 wherein the step of using the following quadratic convergence equation comprises:

setting the constant a equal to a number substantially equal to 3/2; and setting the constant b equal to a number substantially equal to ½.

36. The method of claim 21 wherein the step of providing, via the circuitry for processing floating point operations, the small component value comprises:

calculating a first value (ȳ) having a number n of significant bits wherein n is a positive integer less than P and small enough to calculate the exact component value without rounding error, the first value (ȳ) being the approximate inverse square root value altered to include only n significant bits;

calculating a second value (s̄) having a number k of significant bits wherein k is a positive integer less than P and small enough to calculate the exact component value without rounding error, the second value (s̄) being said number having an exact mathematical square root altered to include only k significant bits; and using the first value (ȳ) and the second value (s̄) to calculate the small component value.

37. The method of claim 36 wherein the step of using the first value (ȳ) and the second value (s̄) to calculate the small component value (δx) comprises:

calculating the small component value using the following equation:

$$\delta x = G*(a - b*\bar{s}*\bar{y}^2) - c*\bar{s}*\bar{y}(\bar{s}*\bar{y}*\delta y + d*G*y)$$

wherein:

G = s̄*δy + y*δs,
y = the approximate inverse square root,
Ȳ = the first value,
δy = the difference between the approximate inverse square root (y) and ȳ,
s = the number having an exact mathematical square root
s̄ = the second value,
δs = the difference between the number (s) and s̄,
a = a first constant,
b = a second constant,
c = a third constant,
d = a fourth constant.

38. The method of claim 37 wherein the step of calculating the small component value further comprises:

setting the constant a equal to a number substantially equal to 3/2;

setting the constant d equal to a number substantially equal to 1;

setting the constant b equal to a number substantially equal to ½; and setting the constant c equal to a number substantially equal to ½.

39. A method for performing a floating point operation within a data processing system, the data processing system having a central processing unit, a means for storing data, and circuitry for processing floating point operations, the method comprising:

transmitting a number having an exact mathematical square root from the means for storing data to the central processing unit via a data bus, the number having a floating point representation within the data processing system;

determining, by a decoding process in the central processing unit, that the data processing system is requesting that the square root of the number be calculated;

transmitting the number from the central processing unit to the circuitry for processing floating point operations;

generating and storing an approximate inverse square root of the number within the circuitry for processing floating point operations wherein the approximate inverse square root number has more than P/2 bits of precision where P is a finite integer greater than zero and equals the number of significant bits in the floating point representation;

using the circuitry for processing floating point operations to provide an exact component value from the number and the approximate inverse square root value wherein the exact component value has a precise representation in the floating point representation and is stored in the means for storing data;

using the circuitry for processing floating point operations to provide a small component value from the number and the approximate inverse square root value wherein the small component value is significantly less than the exact component value and is stored in the means for storing data, the sum of the exact component value and the small component value differs from the exact mathematical square root by less than one half of a value of a least significant bit position of the sum;

adding the exact component value to the small component value via the circuitry for processing floating point operations to provide a trial value, the trial value being altered to be representable in P bits;

determining in the circuitry for processing floating point operations whether the trial value or a modified trial value is a more accurate square root of the number wherein the modified trial value is the trial value added to a logic value wherein the logic value is a value selected from the group consisting of: −1 and 1; and selecting either the trial value or the modified trial value as the square root of the number and providing the square root of the number as an output of the circuitry for processing floating point operations.

40. A method for providing a square root, in a data processor, of a number having an exact square root, the method comprising the steps of:

transmitting, via a hardware bus, at least one control signal and a data value from a control unit of the data processor to a floating point processor portion of the data processor, the control signal being asserted if the floating point processor portion is to find the square root of the number;

generating an approximate inverse square root number within the floating point processor portion wherein the approximate inverse square root number does not exactly equal an inverse of the exact square root of the number, the data processor being able to represent the square root in P hardware bits of precision within the floating point processor portion where P is a finite integer greater than zero;

processing the approximate inverse square root number to generate an exact component value within the floating point processor portion, wherein the exact component value has Q hardware significant bits and may be represented in P bits with no loss of significant bits because $Q \leq P$;

processing the approximate inverse square root number to generate a small component value from the approximate inverse square root number wherein the small component value is significantly less than the exact component value;

adding the exact component value and the small component value within the floating point processor portion to provide a trial value wherein the trial value is altered to be representable in P bits; and selecting either the trial value or the trial value plus a constant as the square root of the number.

41. A method for generating a calculated square root of a number having a mathematically exact square root within a data processor, the data processor having an execution control portion, a data storage portion, and a floating point computational portion, the method comprising the steps of:

reading a number, via a data bus, from the data storage portion to the execution control portion;

determining, by the execution control portion, that the number read from the data storage portion is to be processed so that the number's square root is calculated;

transmitting the number from the execution control portion to the floating point computational portion;

iteratively generating an approximate inverse square root for the number within the floating point computational portion, the approximate inverse square root becoming closer to the mathematically exact inverse square root with each iteration until a predetermined precision tolerance of the approximate inverse square root is achieved, the approximate inverse square root which satisfies the predetermined precision tolerance does not exactly equal the mathematically exact inverse square root of the number, the floating point computational portion being able to represent the approximate inverse square root and the calculated square root in P hardware bits of precision where P is a finite integer greater than zero;

calculating, using the floating point computational portion, an exact component value from the approximate inverse square root wherein the exact component value may be represented in P bits with no loss of significant bits;

calculating, using the floating point computational portion, a small component value from the approximate inverse square root number wherein the small component value is significantly less than the exact component value;

generating a trial value within the floating point computational portion by adding the exact component value and the small component value wherein the trial value is either truncated or rounded to be representable in P bits; and selecting either the trial value or the trial value plus a logic one least significant bit of the trial value as the square root of the number.

42. A method for generating a square root of a number having an exact mathematical square root, the generating being performed via an execution device having a control unit, a memory device, and a floating point unit, the square root being represented via a floating point representation, the method comprising the steps of:

determining, via the control unit and data stored within the memory unit, that the square root of the number is to be generated by the execution device;

providing an approximate adjusted inverse square root number to the execution device from the floating point unit wherein the approximate adjusted inverse square root number has more than P/2 bits of precision where P is a finite integer greater than zero and is the number of significant bits in the floating point representation;

calculating, using the floating point unit, an exact component value from the number and the approximate adjusted inverse square root value wherein the exact component value has a precise representation in the floating point representation;

calculating, using the floating point unit, a small component value from the number and the approximate adjusted inverse square root value wherein the small component value is significantly less than the exact component value, the sum of the exact component value and the small component value differs from the exact mathematical square root by less than one half of a value of a least significant bit position of the sum;

calculating, using the floating point unit, a trial value by adding the exact component value and the small component value wherein the trial value is altered to be representable in P bits; and selecting one of either the trial value or the trial value plus a constant as the square root of the number.

43. The method of claim 42 wherein the step of selecting either the trial value or the trial value plus the constant comprises:

calculating the trial value plus a constant as being the trial value wherein a logic one is added to the least significant bit position of the trial value.

44. The method of claim 42 wherein the step of providing the approximate adjusted inverse square root number comprises:

using an iterative process to determine the approximate adjusted inverse square root number.

45. The method of claim 42 wherein the step of providing the approximate adjusted inverse square root number comprises:

using an iterative quadratic convergence process to determine the approximate adjusted inverse square root number.

46. The method of claim 45 wherein the quadratic convergence process comprises the steps of:

(a) providing an initial approximation of the inverse square root;

(b) calculating a more accurate adjusted approximation ($y_n$) from the prior adjusted approximation ($y_{n-1}$) using the equation:

$$y_n = y_{n-1}(a - b^*s^*(y_{n-1})^2)$$

wherein:
s is equal to the data operand having a precise mathematical square root,
a is a first constant, and
b is a second constant;
(c) iterating step (b) by setting $y_n$ calculated from step (b) to $y_{n-1}$ and calculating a new $y_n$ from step (b) until a predetermined number of bits of precision are attained for $y_n$ in step (b); and
(d) using a last calculated $y_n$ as the first floating point value.

47. The method of claim 46 wherein step (b) further comprises:
setting the constant a equal to a number substantially equal to 3/2; and
setting the constant b equal to a number substantially equal to ½.

48. The method of claim 42 wherein the step of providing an approximate adjusted inverse square root number comprises:
using an iterative cubic convergence process to determine the approximate adjusted inverse square root number.

49. The method of claim 48 wherein the quadratic convergence process comprises the steps of:
(a) providing an initial approximation of the inverse square root;
(b) calculating a more accurate adjusted approximation ($y_n$) from the prior adjusted approximation ($y_{n-1}$) using the equation:

$$y_n = y_{n-1}(a - b^*s^*(y_{n-1})^2 + c^*(s^*(y_{n-1})^2)^2)$$

wherein:
s is equal to the number having an exact mathematical square root,
a is a first constant,
b is a second constant, and
c is a third constant;
(c) iterating step (b) by setting $y_n$ calculated from step (b) to $y_{n-1}$ and calculating a new $y_n$ from step (b) until a predetermined number of bits of precision are attained for $y_n$; and
(d) using a last calculated $y_n$ as the first floating point value.

50. The method of claim 49 wherein step (b) further comprises:
setting the constant a equal to a number substantially equal to 15/8;
setting the constant b equal to a number substantially equal to 5/4; and
setting the constant c equal to a number substantially equal to ⅜.

51. A data processor for calculating a square root of a number, the data processor comprising:
an execution device for processing data within the data processor;
means for approximating an inverse square root of the number coupled to the execution device;
a memory device which stores a first binary value and a second binary value wherein the first binary value, when decoded by the execution device, indicates that a square root operation is to be performed on the second binary value; and
means for processing the square root operation coupled to the execution device, the means for processing receiving an inverse square root approximation from the means for approximating an inverse square root approximation, iteratively providing a more accurate inverse square root approximation from the inverse square root approximation, using the more accurate inverse square root approximation and the number to create both an exact floating point value and a small floating point value wherein the sum of the exact floating point value and the small floating point value is a substantially close approximation to the actual square root of the number.

* * * * *